United States Patent
Luzzatti et al.

(10) Patent No.: US 6,714,519 B2
(45) Date of Patent: Mar. 30, 2004

(54) COMMUNICATIONS AVAILABILITY

(75) Inventors: Omer Luzzatti, New York, NY (US);
Ofer Shem Tov, Ramat Gan (IL); Eran Shtiegman, New York, NY (US); Gur Kimchi, New York, NY (US); Dror Tirosh, Raanana (IL)

(73) Assignee: VocalTec Communications Limited, Herzliya (IL)

( * ) Notice: Subject to any disclaimer, the term of this patent is extended or adjusted under 35 U.S.C. 154(b) by 121 days.

(21) Appl. No.: 09/916,220

(22) Filed: Jul. 26, 2001

(65) Prior Publication Data

US 2002/0024947 A1 Feb. 28, 2002

Related U.S. Application Data (63) Continuation-in-part of application No. 09/714,016, filed on Nov. 16, 2000, which is a continuation of application No. 08/780,739, filed on Jan. 8, 1997, now Pat. No. 6,243,398, which is a continuation-in-part of application No. 08/731,848, filed on Oct. 21, 1996, now abandoned.

(60) Provisional application No. 60/245,525, filed on Nov. 3, 2000.

(51) Int. Cl.[7] ................................................. H04J 1/16
(52) U.S. Cl. ..................... 370/252; 370/352; 379/88.17
(58) Field of Search ........................ 455/461; 370/522, 370/256, 359, 252, 352–356, 400, 401; 379/201, 88.17

(56) References Cited

U.S. PATENT DOCUMENTS

| | | | |
|---|---|---|---|
| 5,375,161 A | 12/1994 | Fuller et al. | |
| 5,432,845 A | 7/1995 | Burd et al. | |
| 5,471,519 A | 11/1995 | Howe et al. | |
| 5,579,375 A | 11/1996 | Ginter | |
| 5,600,704 A | 2/1997 | Ahlberg et al. | |
| 5,652,789 A | 7/1997 | Miner et al. | |
| 5,742,905 A | * 4/1998 | Pepe et al. ................. | 455/461 |
| 6,498,797 B1 | * 12/2002 | Anerousis et al. .......... | 370/522 |

FOREIGN PATENT DOCUMENTS

| | | |
|---|---|---|
| WO | 97/20423 | 6/1997 |
| WO | 98/18237 | 4/1998 |
| WO | 99/08434 | 2/1999 |
| WO | 99/34628 | 7/1999 |
| WO | 00/41533 | 7/2000 |

* cited by examiner

*Primary Examiner*—John Pezzlo
(74) *Attorney, Agent, or Firm*—Katten Muchin Zavis Rosenman (57) ABSTRACT

Subscribers are able to selectively reveal their availability for communicating to various entities, based on the interaction of one or more customizable policies, preferences and active status of communicating devices. Availability status software comprising one or more agents determines and indicates the availability mode of specifically identified entities. Subscribers are able to establish a personal agent and control policies and preferences remotely using, for example, an internet connected computer-based device. Alternatively, service providers are able to modify the content of the agent of behalf of their subscribers in accordance with predetermined communication preferences (automatic or defined by subscribers).

26 Claims, 9 Drawing Sheets

FIG. 8

COMMUNICATIONS AVAILABILITY

RELATED APPLICATIONS

The present application claims the benefit of provisional patent application "Communication System" Ser. No. 60/245,525, filed Nov. 3, 2000. This is also a continuation-in-part of Ser. No. 09/714,016 filed Nov. 16, 2000, which was a continuation of Ser. No. 08/780,739 filed Jan. 8, 1997 now issued as U.S. Pat. No. 6,243,398 which was a continuation-in-part of Ser. No. 08/731,848 filed on Oct. 21, 1996 now abandoned.

"Portions of the disclosure of this patent document, in particular Appendix A, contain unpublished material which is subject to copyright protection. The copyright owner, VocalTec Communications, Ltd. has no objection to the facsimile reproduction by anyone of the patent document or the patent disclosure, as it appears in the U.S. Patent and Trademark Office patent files or records, but otherwise reserves all rights whatsoever."

BACKGROUND OF THE INVENTION

1. Field of Invention

The present invention relates generally to the field of network communications. More specifically, the present invention is related to a system and method for call routing and selective disclosure of available modes of communication.

2. Discussion of Prior Art

Networks, such as wide area networks and the Internet, allow users to communicate multimedia information between various computer-based devices. Prior art systems provide various ways for communicating voice and video over the Internet. One drawback associated with such prior art systems is the inability of users to control such communication devices, over a network, to define personalized routing of information.

State of the art systems enable users to utilize (in conjunction with a network such as the Internet) a number of communication devices integrated with conventional telephony systems. For example, Internet phones, cellular phones, video conferencing equipment are implemented to work with conventional wide area network (WAN) systems. But, in a scenario wherein one or more communication devices (representative of one or more communication systems or mediums) are linked to a WAN, such systems are not able to dynamically direct an incoming communication to a communication device of choice that is linked to the WAN.

The following references describe prior art in the field of network communications, but none of them provide for an interface wherein subscribers are able to dynamically reveal their communication availability (i.e., text, voice, not available, home, at work, on vacation, etc.) in varying forms to one or more individuals (or organizations).

U.S. Pat. Nos. 5,375,161 and 5,432,845 provide for a telephone control redirection or routing system. These patents allow for the rerouting of incoming calls to one or more predetermined locations.

U.S. Pat. No. 5,471,519 provides for a communications monitoring and control system wherein, upon receipt of communication, the system determines the location of the called party from a changeable list including locations selectively provided by the called party. The communication can be accepted, rejected or monitored by the called party. Furthermore, the called party can discontinue monitoring or connect to the communication at any time during the communication.

U.S. Pat. No. 5,579,375 provides for a call transfer within cellular communications system wherein calls that cannot be completed are redirected with an intelligent call forwarding list. The patent's method includes analyzing a request along with a priority list to determine the optimum number (from the list) for transfer and completion of the call.

U.S. Pat. No. 5,600,704 provides for a system and method for prioritized routing of telephone calls to a subscriber wherein the telephone numbers of the several telephones associated with the subscriber are initially assigned relative priorities such that the telephones are sequentially alerted according to the prioritized routing lists of telephone numbers when a telephone call is placed to the subscriber. For example, when a call to a cell phone goes unanswered, it is automatically forwarded to the next priority number.

Furthermore, it should be noted that the prior art systems fail to provide for an interface that dynamically indicates, either aurally or visually, the availability of other users based on their desire to selectively reveal their availability, on the current status of their communication devices, on their current forwarding rules and on the requestor's identity. Additionally, in the prior art systems described above, users are not able to customize their routing flow based on who is initiating the communication. These and other improvements to the prior art will be described hereafter in the detailed description.

Whatever the precise merits, features and advantages of the above mentioned prior art systems and references, none of them achieve or fulfills the purposes of the present invention.

SUMMARY OF THE INVENTION

The present invention provides for a system and method for a subscriber to dynamically reveal their availability status for communicating with one or more entities or grouped entities. A subscriber creates one or more routing policies for specific entities or groups (that help determine the order of termination of communication devices (e.g., home, office, cellular, unavailable, etc.) as well as the type of available communication medium (i.e., text, voice, etc.). The availability status is a function of the current policy of the subscriber, which contains their routing policies, general and security preferences (privacy), and their devices' current status (presence). The dynamic, subscriber controlled, combination of these items will create a selective revealing of the subscribers availability based on a match to a correspondingly identified requestor.

Based on the present invention, subscribers are able to maintain one or more policies (corresponding to one or more requesters or groups of requesters) that help selectively reveal the availability mode of a subscriber based on the identity of the requester. For example, if subscribers L and M initiate a communication requesting the availability of subscriber N, and subscriber N utilizes two communication devices, device 1 and device 2, to receive such communications, the system of the present invention allows subscriber N to maintain two separate policies, one each for subscribers L and M, regarding how the incoming communication (regarding availability) is to be handled. In other words, the system of the present invention allows subscriber N to selectively reveal the availability (to subscribers L and/or M) for communication (via device 1 and/or device 2) based on subscriber-based pre-defined customizable policies. For example, if device 1 in the described example is a home phone and device 2 is a cellular phone, the system of the present invention allows subscriber N to create:

A first policy to reveal availability in the home phone and cellular phone if subscriber L is initiating the availability request, and A second policy to reveal availability in home phone only if subscriber M is initiating the availability request.

The present invention further provides for both a visual (e.g., GUI) and aural (e.g., IVR) interface for notification of availability modes associated with subscribers, to any requester, using any communications medium. In a preferred embodiment visual interface, a contact list of subscribers is modified as the availability status of those listed changes (including changes in policy by the contacts towards the possessor of the contact list). Furthermore, the interface visually modifies graphical images (such as icons) to indicate the various availability modes associated with subscribers in the contact list (passive) as well as requests about subscribers not in the contact list (active).

In an exemplary IVR embodiment, a request for status availability is received by the system through, e.g. PSTN, cellular, etc., and the subscriber status revealed back through the originating telephone connection. Furthermore, the present invention used in conjunction with a network, such as the Internet, allows subscribers to receive calls on any desired device (e.g., IP client, PSTN, Mobile) using the routing policy that lists the communication devices in the desired order of termination.

In another extended embodiment, the queries for availability of subscribers are performed via an electronic message such as e-mail. In this scenario, the availability mode of the subscriber who is to be contacted is returned via an electronic message to the requestor.

In yet another embodiment, service providers are able to modify the active subscriber policies of behalf of their subscribers in accordance with predetermined communication preferences (automatic or defined by subscribers).

DESCRIPTION OF THE PREFERRED EMBODIMENTS

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that the term "user" is used interchangeably throughout the specification with "subscriber" and in addition each user/subscriber can be defined as a "recipient" or "requestor" depending on whether one is receiving a communication request for determining availability (or receiving an update of a contact list from a system server) or whether one is initiating a communication for determining availability.

The method of the present invention may be implemented, for example, via availability status determining software such as one or more availability mode manager agents (AMMA). Each AMMA determines an availability mode for a specific subscriber based on a current policy of the subscriber (their routing policy+privacy preferences) and the presence of the subscriber's devices. According to the present invention, whenever a query for an 'availability status' (active) or a server initiated update (passive) of subscriber's availability is made, a subscriber's availability function (or agent) is activated. The specifics of the agent are not necessary for a complete understanding of the present invention; other functionally equivalent methods of intelligently filtering the availability data can be substituted therefore without departing from the scope of the present invention. The specific weighting given to the policy and presence information as well as the specific algorithms used to evaluate this information should not be restrictive to the present invention's novel dynamic revealing of an availability status indicator.

In addition, the described embodiments include a general discussion of policies (including routing policies), however, a full description of exemplary policy parameters may be found in co-pending US patent application, Ser. No. 08/780,739, hereby incorporated by reference.

Figure 1:
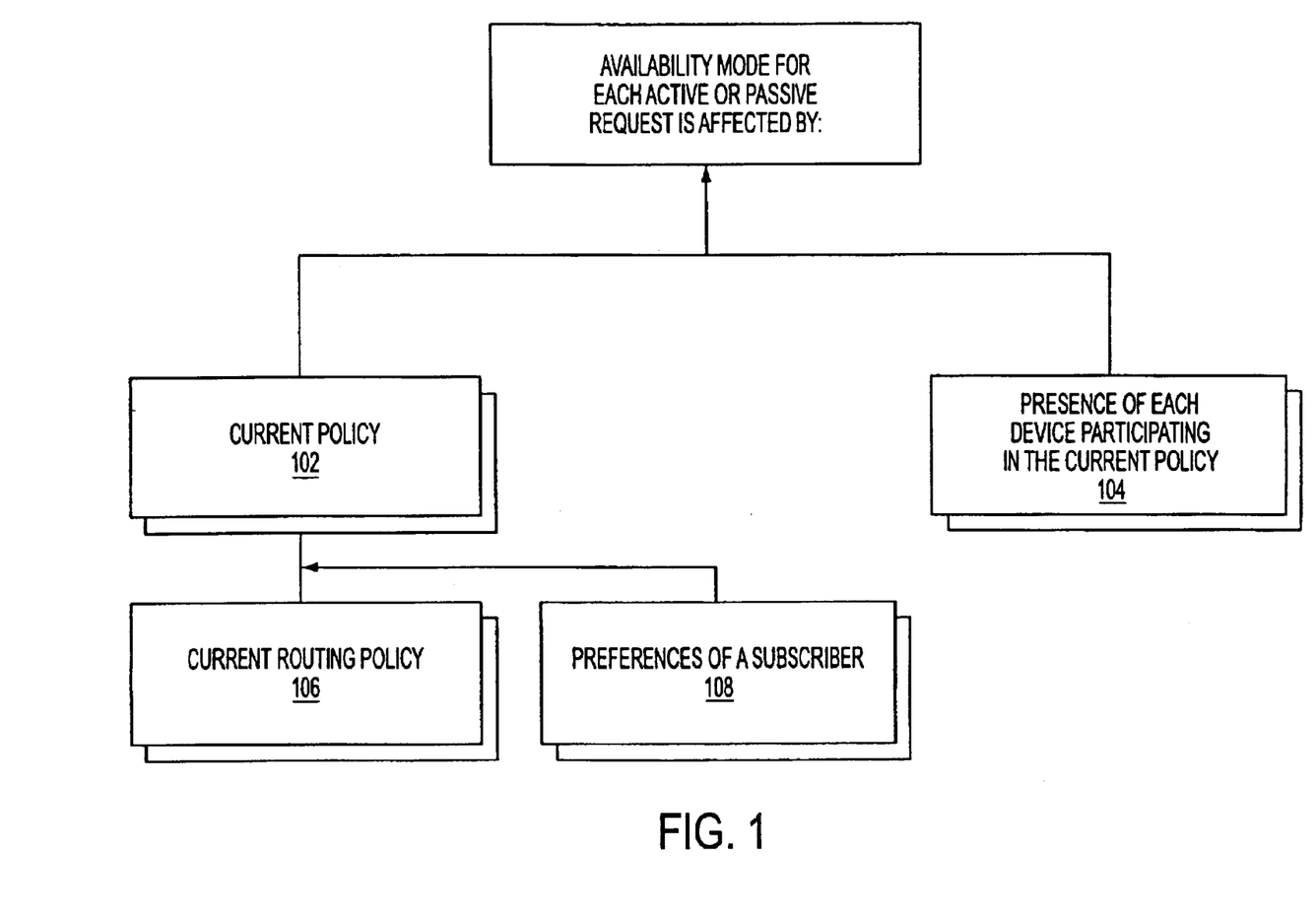
FIG. 1 illustrates the various parameters that affect a query for determining the availability mode.

FIG. 1 illustrates an availability status functional hierarchy, the hierarchy comprising determining for each request for availability status of a subscriber (active) or server initiated (passive) updating of status availability changes of subscribers:

a) The current policy of each subscriber 102. The current policy consisting of a combination of the current routing policy 106 of the subscriber and the subscriber's preferences (e.g., security or other privacy preferences). The routing policy defines how an incoming communication (such as a call or text messages or video conference) is to be routed. Examples of subscriber preferences 108, include but are not limited to: 'don't show my current routing policy to people that are not in my contact list', 'show mom that I'm available only for text no matter what my real availability is', 'I want only video conferencing with my kids' etc.

b) The presence of each communication device (e.g., office phone, cell phone, instant messaging, e-mail, etc.) participating in the current routing policy 104.

It should however be noted that, although the routing policy has the greatest effect on the availability mode, it is not a one-to-one correspondence as other parameters are involved in the generation of the availability mode. Thus, the availability mode of the present invention is a function of the routing policy, the devices' presence and preferences of a subscriber.

An availability indicator is what is shown/played to a subscriber requesting the 'status' (i.e., the availability status)

of a subscriber. It should be noted that a variety of interfaces (by which one queries the availability mode) can be used in conjunction with the invention. For example, subscribers are able to query the availability mode of another subscriber via a browser based GUI, a cellular phone interface, wherein the cellular phone is wireless application protocol (WAP) enabled, or using a regular phone (PSTN) to query the availability of the subscribers using IVR.

Similarly, a dual tone multi-frequency (DTMF) telephone system can be used to query the availability mode of another subscriber. For example, one can call and inquire about the availability mode of a subscriber and receive the response in the same phone using an interactive voice response (IVR) feature.

In one embodiment, subscribers with electronic messaging access are able to send a message (such as an email) querying the availability mode of another subscriber. In such a scenario, the 'availability mode' of the queried subscriber is also returned via an electronic message such as email.

In yet another embodiment, a graphical user interface (GUI) is used to passively (server initiated) illustrate availability modes of a subscriber or enable active requests for availability status information. In this scenario, icons representative of the availability mode of the queried subscriber are sent and displayed in requestor's GUI.

Figure 2:
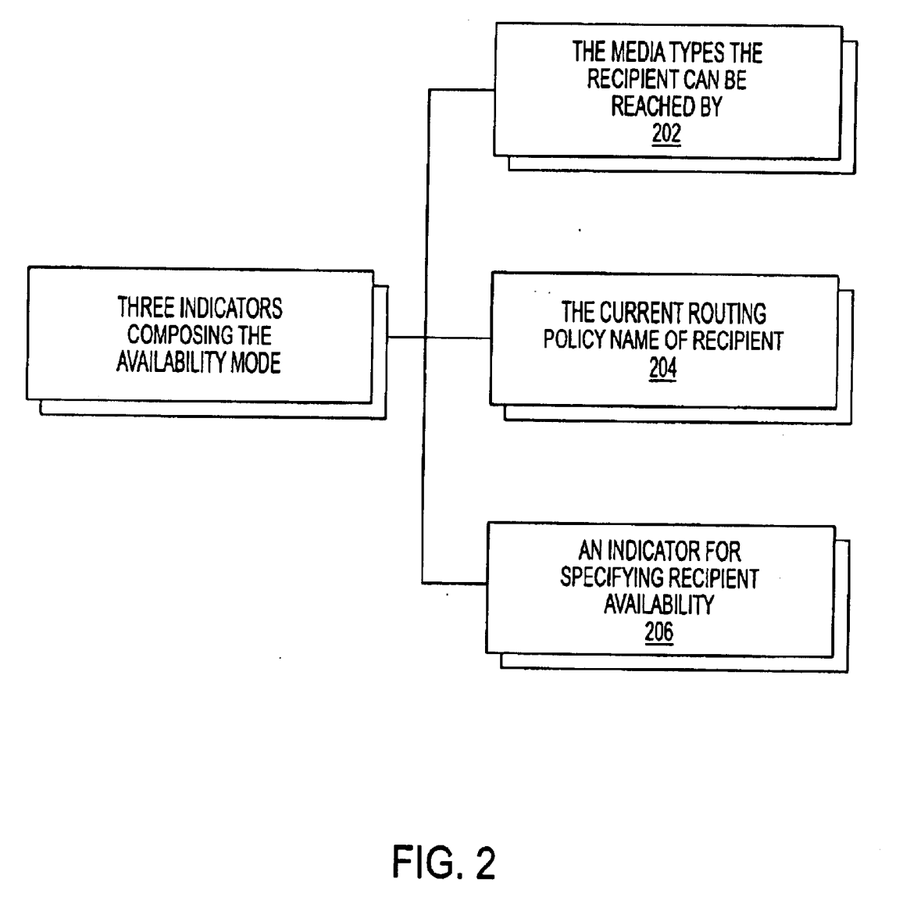
FIG. 2 illustrates the three indicators associated with the availability mode.

Thus, as illustrated in FIG. 2, the availability mode comprises one or more of three different indicators (visual or aural):

1) Media types the subscriber can be reached by 202.
2) Current routing policy name of the subscriber 204.
3) An indicator for specifying the subscriber's availability. For example, in the case of a GUI, an icon indicating the subscriber's availability 206 is displayed via an interface. It may indicate 'in a meeting', 'busy', 'please don't call', etc. It should be noted that the number of icons is either equal to or be less than the number of routing policies.

The 'presence' of a device is an indicator about the device current 'status'. Different devices have different statuses associated with them. For example, in a telephone (such as a network phone or Internet phone), 'presences' are any of the following: online, offline, away, or busy. Additionally, regular phones also include the 'presence', 'unknown'. Cellular phones, on the other hand include the following 'presences': connected, silent, or busy.

In one embodiment, the present invention maps each of the device's preferences to four 'presences': online, offline, away and busy. For example, 'Silent' on client (e.g., a mobile device) means 'offline', but the subscriber is able to decide what 'silent' means and thus, by consequence, how it affects the availability mode.

The preferences of a subscriber also affect the availability mode. For example:

Subscribers are able to show different availability modes (of media types) for different contacts/non-contacts. Thus, subscribers are able to discriminate and control what is shown to different groups.

Subscribers are able to show the current routing policy name.

Subscribers are able to change the interpretations of presence. For example, instead of saying that 'silent' on cellular means 'offline', uses are able to define it as 'away').

Figure 3:
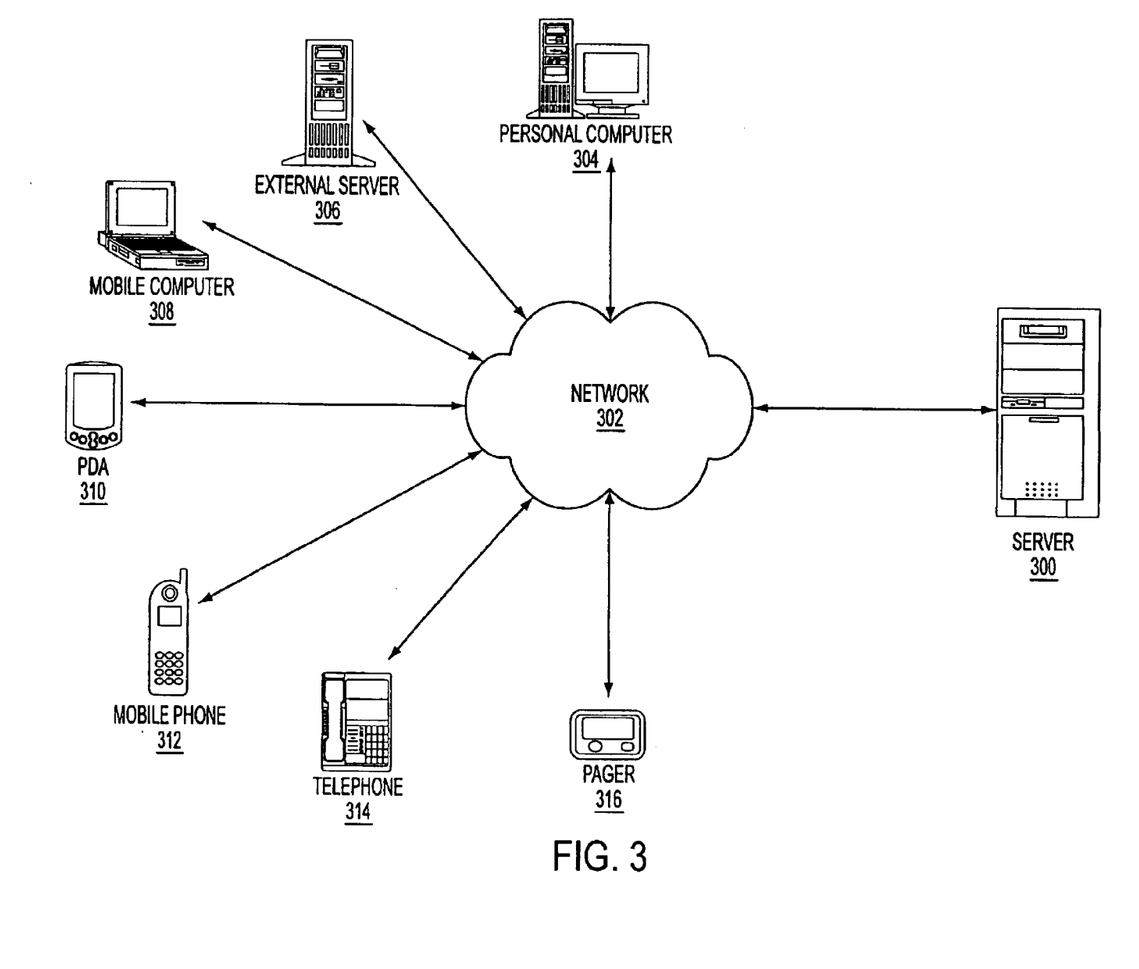
FIG. 3 illustrates a scenario wherein users are able to access a server hosting the present invention, over a network, via a computer-based device.

FIG. 3 illustrates a scenario wherein subscribers are able to access a server hosting the present invention's availability status determining software over a network via a variety of communication devices. For example, a subscriber is able to access server 300 over network 302 via any of the following devices: personal computers 304, external server 306, mobile computers 308, personal digital assistant (PDA) 310, mobile phones 312, telephones 314, or pagers 316. It should however be noted that although only certain devices are illustrated as input/output devices in FIG. 3, one skilled in the art can envision substituting other communication devices in place of the devices illustrated. Network 302, described in the FIG. 3, and as used in this specification is any of, but not limited to, the following networks: local area network (LAN), wide area network (WAN), Internet, Wireless or cellular networks.

Figure 4:
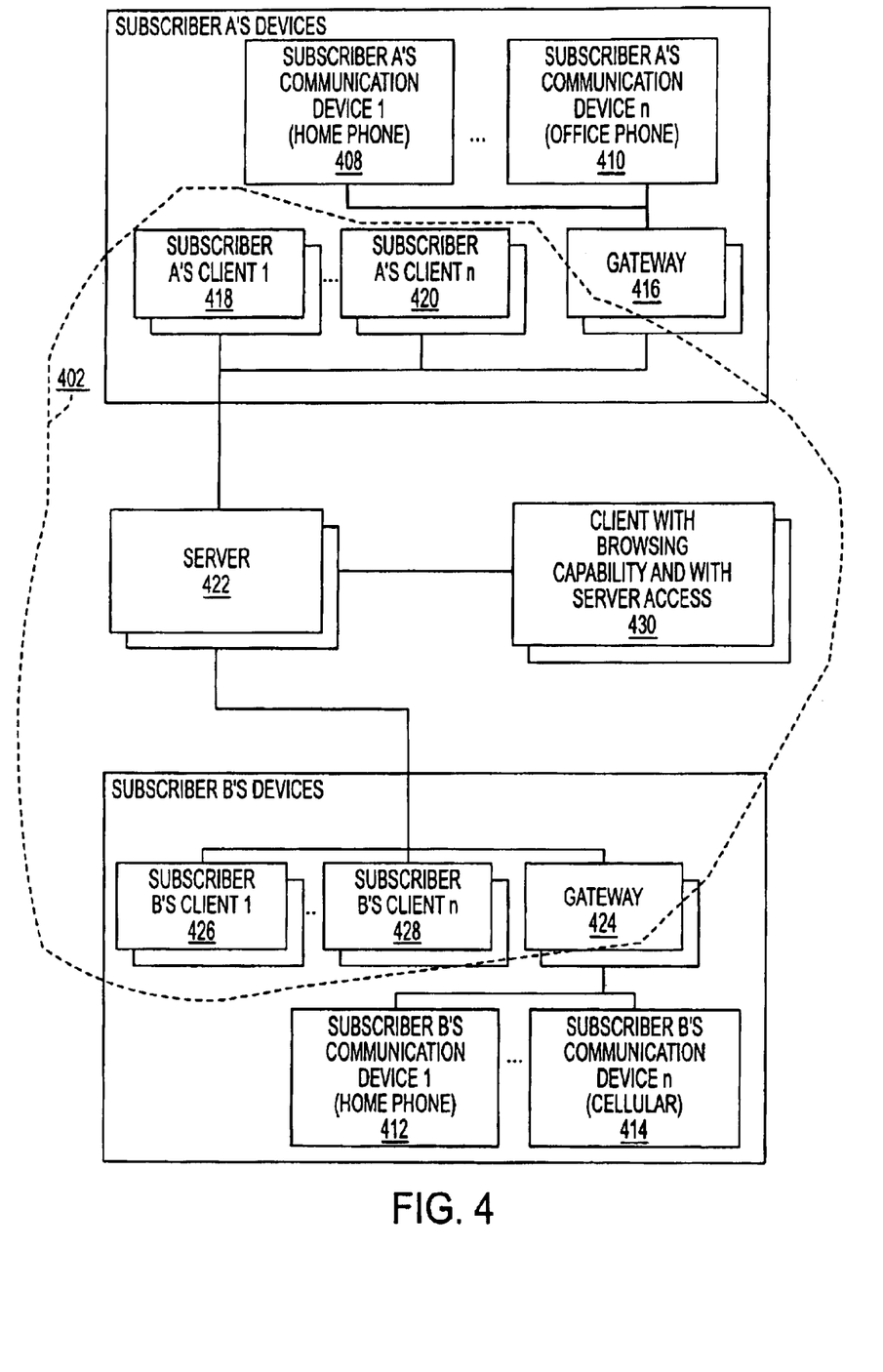
FIG. 4 illustrates a specific example wherein the system of the present invention is used in conjunction with the Internet.

FIG. 4 illustrates a preferred embodiment wherein the present invention is used in conjunction with Internet 402. Furthermore, the network comprises a plurality of subscribers that have access to conventional gateways such as telephone gateways. Two users (subscriber A and subscriber B) are used in the examples to follow and should be noted that this scenario is used for illustration purposes only. Thus, one skilled in the art can extend the same description for any number of subscribers or groups of subscribers without departing from the scope of the invention. In addition, the example has identified an active mode (request) for revealing the availability status, however, equally applicable in the preferred embodiment, the server will automatically push updates of subscriber availability to all contact lists containing a specific subscriber.

As mentioned above, each subscriber employs a plurality of communication devices, communication device 1 (408 (A), 412 (B)) through communication device n (410 (A) and 414 (B)), to communicate with other subscribers over the Internet. As in the illustrated example, subscriber A utilizes communication devices such as a home telephone or office telephone, wherein both phones are connected to the Internet via a gateway, such as telephony gateway 416. Furthermore, subscriber A is able to employ one or more clients (418–420) to communicate directly with server 422 and with other subscribers via a network, such as the Internet. For example, subscriber A is able to utilize a client such as a computer to connect to the Internet. Furthermore, subscriber A's computer is equipped with an application enabling audio and video conferencing, to send and receive instant messaging, to see the availability modes of their contacts and their current routing policy.

Likewise, subscriber B employs communication devices (412–414) such as a home telephone and cellular phone, wherein the communication devices are connected to a network such as the Internet via a gateway, such as telephone gateway 424. In case of a cellular phone, it is connected to the cellular telephone company via a cellular network and from there to the Internet via the telephony gateway. Similar to subscriber A, subscriber B also has direct access to server 422 via the Internet through one or more clients (426 and 428). Just as with subscriber A, subscriber B is able to employ an application enabling audio and video conferencing, to send and receive instant messaging, to see the availability modes of their contacts and their current routing policy.

It should be noted that although specific examples of network gateways, such as telephone gateways, are used in illustrating the present invention, one skilled in the art can extend the present invention to encompass other means for accessing a network. For example, subscribers are able to access server 422 via a remote computer client (connected to the Internet) 430 that includes a browser such as MICROSOFT's EXPLORER or NETSCAPE. Sybscriber A's webpage, in one embodiment, contains an indication regarding availability of other subscribers.

It should be further be noted that although in the preferred embodiment the server is accessed by one or more subscribers, an extended embodiment is envisioned wherein users who are not subscribers are also able to request availability modes of one or more subscribers (such as the IVR/e-mail embodiments described previously).

Continuing with the example, using the present invention, subscriber A configures home telephone and office telephone numbers. Next, automatic routing policies are either picked (from pre-defined policies) or created anew. Given below is an example for a routing policy for subscriber A. In this example, subscriber A utilizes the various available policies. As mentioned earlier, there is also a possibility of customizing the routing policies to meet individual needs.

Subscriber A's Routing Policies
Policies Available
  Out of reach (don't accept audio and don't accept text).
  Text only (accepts only text).
  Network Phone (such as an Internet Phone) routing order:
    PC
  Client first, then Office phone, then Home phone.
  Home (only home phone).
  Office (only office phone).
    Subscriber A's current chosen policy is an Internet phone.
    Both client 1 and client n are online.
    Subscriber A has Subscriber B in the contact list.
    Subscriber A's preferences say: 'Show my availability mode to people in contact list, but not to people not in contact list.'

Continuing with the example, using the present invention, subscriber B configures cellular and home telephone numbers. Next, automatic routing policies are either picked from pre-defined policies or created anew. Given below is an example for a routing policy for subscriber B. In this example, subscriber B customizes the routing policies to meet individual needs.

Subscriber B's Routing Policies
Policies Available
  Out of reach (don't accept audio and don't accept text).
  In a meeting (accept text only).
  Network phone (such as an Internet phone): Routing order is PC
  client first then mobile phone).
  Mobile (mobile phone).
  Home (home phone, mobile phone)
    Subscriber B's current chosen policy is 'in a meeting.'
    Client 1 is online.
    Subscriber B has Subscriber A in the contact list.

As mentioned earlier, a request (active mode) for the availability mode of a subscriber can be originated from any connected device illustrated in FIG. 3. A simple scenario would be: a request to know the availability mode of subscriber A is directed to server 422 from one of subscriber B's devices. Knowing the current chosen routing policy and privacy preferences of subscriber A, and being aware of the presence of each of subscriber A's devices, server 422 determines subscriber A's availability mode for subscriber B and sends the calculated availability mode to subscriber B. The response will include the media types subscriber A currently supports, the name of their current routing policy and an indication of their availability status. The format of the response is any of, but not limited to, the following: audio input/output such as IVR, text or graphical.

In the above example, using the current settings, subscriber B will see subscriber A as available for online calls and for instant messaging. Furthermore, the current routing policy name of subscriber A (Network Phone) is visible to subscriber B. If, for example, subscriber A now deletes subscriber B from the contact list, subscriber B will stop from seeing subscriber A as available for call or for text (due to his preferences), although subscriber B's routing policy wasn't changed.

According to the present invention, a determination of the availability mode of subscriber A is directed to an agent of the availability status software hosted by server 422 (e.g., Availability Mode Manager Agent (AMMA)). The agent receives this request from a device employed by one of the subscriber's contacts (or from an intermediate device to which one of the subscriber's contacts is connected, or from an intermediate device to which one of the subscriber's contacts is connected, or from any other computer-based device). A non-limiting example for a contact's device is a phone, or a mobile phone with WAP capabilities or a network phone (such as a black phone) connected to the Internet via a telephone gateway. The agent determines subscriber's availability mode for specific subscriber's contacts based on the current chosen policy of the subscriber, the privacy preferences of the subscriber, and the presence of each of the subscriber's devices.

It should be noted that while the present invention is described with respect to a single subscriber connected to an agent of the availability status software, one skilled in the art can extend it to be applicable to a plurality of subscribers connected to a single agent, to multiple agents, or to a service provider modifying one or more agents on behalf of its subscribers in accordance with predetermined communication receipt preferences (automatic or defined by subscriber.

Figure 5:
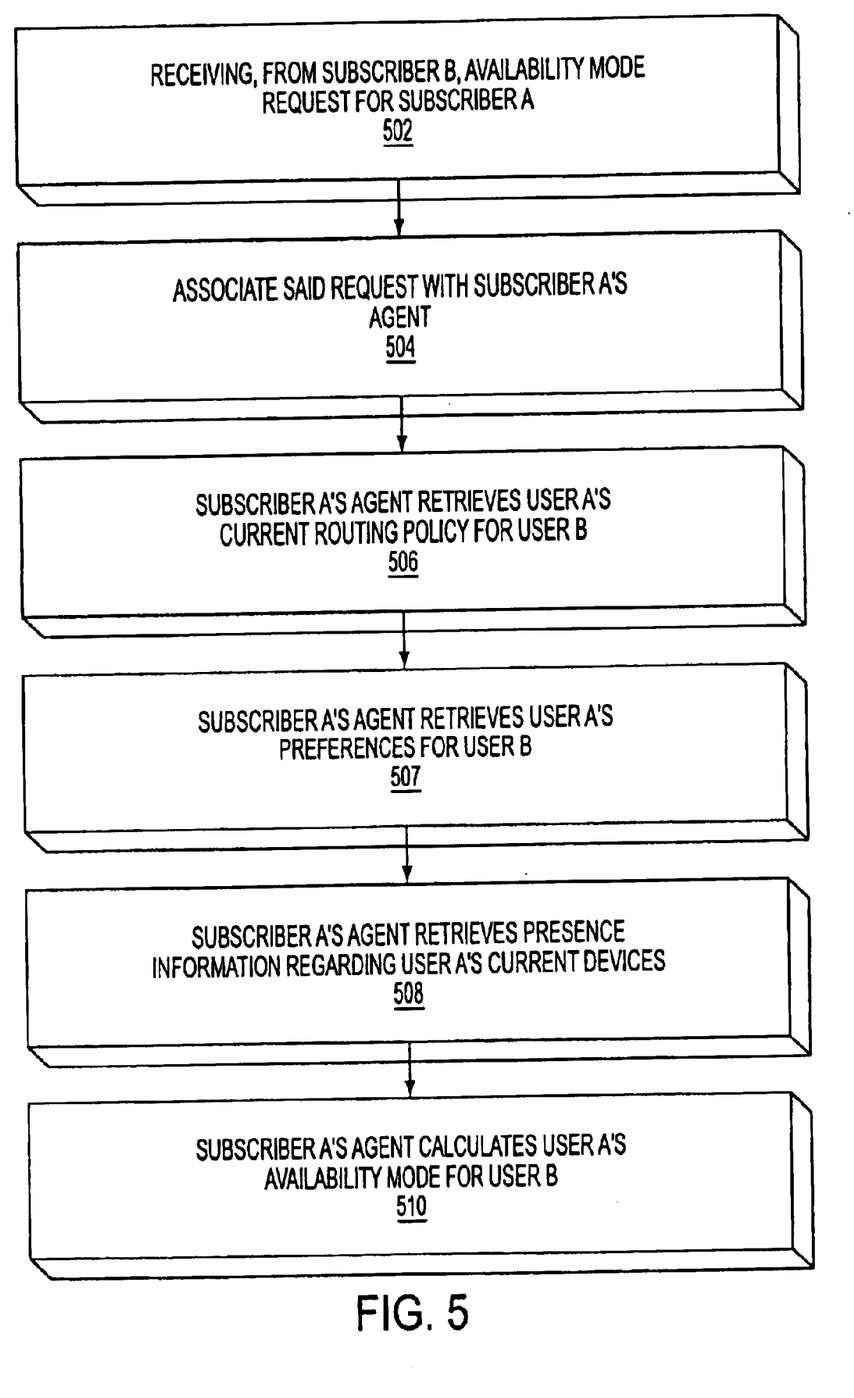
FIG. 5 illustrates the method associated with the present invention.

FIG. 5 illustrates the method associated with the present invention for retrieving the availability mode of a subscriber. In this non-limiting example, a request is received from subscriber B inquiring the availability status of subscriber A (step 502). Next, the request is directed to subscriber A's agent along with the information that subscriber B is the one asking for availability information (step 504).

Next, subscriber B's policy is obtained, the policy comprising both the routing policy and preference retrieval steps 506 and 507. In step 506, the agent retrieves subscriber A's current routing policy, which indicates what the current relevant devices are currently used by subscriber A, their order of preference, and the media types supported in each of them. It should be noted that each subscriber always has at least one routing policy selected. However, it should also be noted that subscribers are able to have more than one routing policy, thereby allowing them to differentiate policies based on groups (for example, for mom my routing policy is 'sleeping' and for friend it is 'at home').

In step 507, subscriber A's agent retrieves the preferences of subscriber A. Subscriber A's preferences file includes information regarding: whether subscriber A allows others to receive the availability mode, whether the availability mode should be shown to people in the contact list, and who are the people that cannot have access to the availability mode.

In step 508, subscriber A's agent retrieves the presence information of all of subscriber A's devices. The presence information can be retrieved from all of subscriber A's devices, but it should be noted that it is not obligatory that each of subscriber A's devices transmit its presence. For example, subscriber A's client 1 may be in presence type 'online', 'offline', or 'away' and subscriber A's home telephone may be in presence type 'unknown' or 'busy' and the agent is able to retrieve this information upon its own request, or whenever the presence information of the device has changed, or whenever the device decides to send its presence information to the agent. One skilled in the art should recognize that there is no limit on the number of presence types that can be defined in conjunction with the present invention and should not be restricted by various ways of retrieving the presence information. Additionally, in an extended embodiment, the agent asks a device's current presence when the information is needed.

In step 510, the agent calculates subscriber A's availability mode for subscriber B. For example, if subscriber A's current policy is 'out of reach', regardless of what the presence of each of the devices, subscriber B, like any other subscriber, will see subscriber A as unavailable for any kind of communication. In the passive mode, any change whatsoever, to the information contained in steps 506–508 affects the availability mode of subscriber A and is sent (pushed by a server active verb) to all subscribers having subscriber A's on their contact lists.

Described below is an example of a change to presence, privacy settings and policy wherein subscriber A's network phone 1 is 'offline', subscriber A's home telephone presence is 'unknown', subscriber A's office phone is 'busy' and subscriber A's network phone 2 is 'online'. Furthermore, subscriber B is in subscriber A's contact list and vice versa. Additionally, subscriber B is not in subscriber A's ignore list and thus allows anyone to see his availability mode. Subscriber A's current policy is 'network phone' as described above. In the situation as described, subscriber B sees subscriber A as available for text chat and audio conversation.

In the event subscriber A's client 1 goes 'offline', subscriber A's agent receives an indication, calculates subscriber A's availability mode and sends the information to subscriber B. In this instance, subscriber B will see subscriber A as available for audio, but not for text chat. If, on the other hand, subscriber A's home phone changes the mode to 'busy', subscriber A's availability mode will be recalculated and subscriber B will see him as available neither for audio nor for text chat. But, if subscriber A's network phone 1 changes the mode from 'offline' to 'online', subscriber B subscriber A as being online again.

Now considering the instance wherein subscriber A adds subscriber B to his ignore list and sets the preferences to not allow people in the ignore list to see the availability mode. In such a case, agent will recalculate subscriber As availability mode, and subscriber B will see subscriber A as not available for audio conversation and not available for text chat.

On the other hand, if subscriber B is deleted from subscriber A's ignore list, subscriber B sees subscriber A as available both for audio and for text messaging. But, if subscriber A changes his policy (either by using the web, the Network Phone, or any of his other devices) to be 'text only', this information is received by the agent and sent to subscriber A's relevant contacts.

Figure 6A:
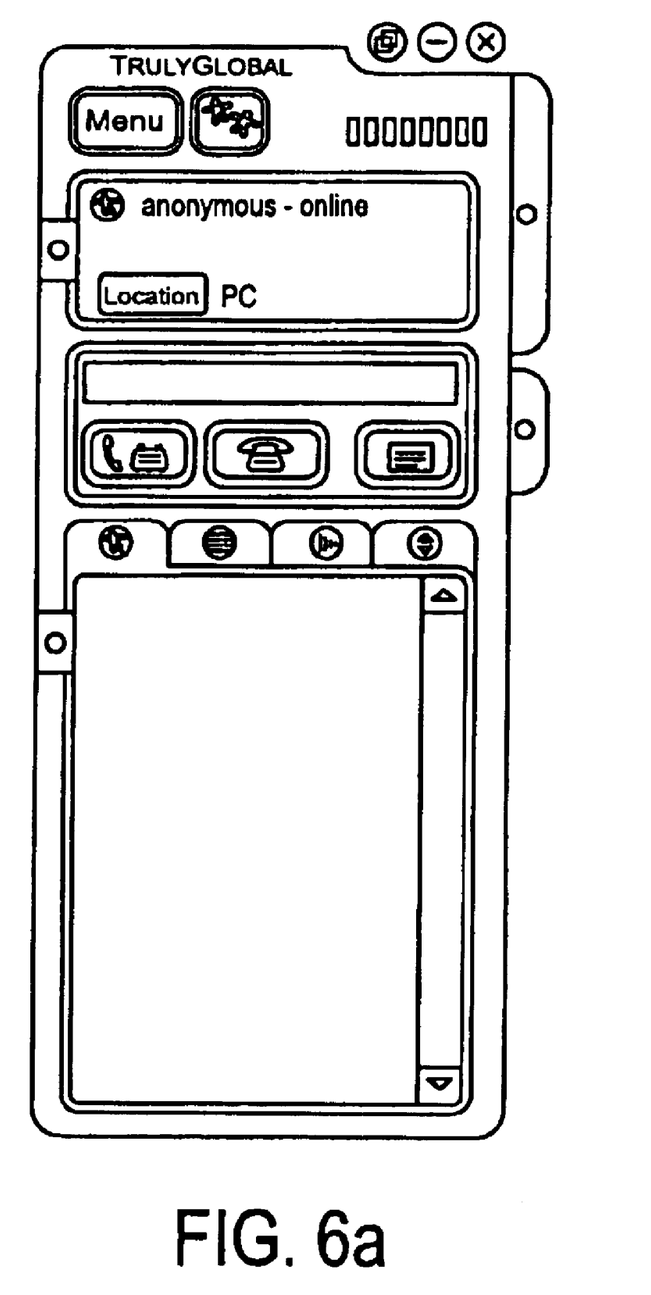
FIGS. 6a and 6b, collectively, illustrate the GUI implementing the present invention.
Figure 6B:
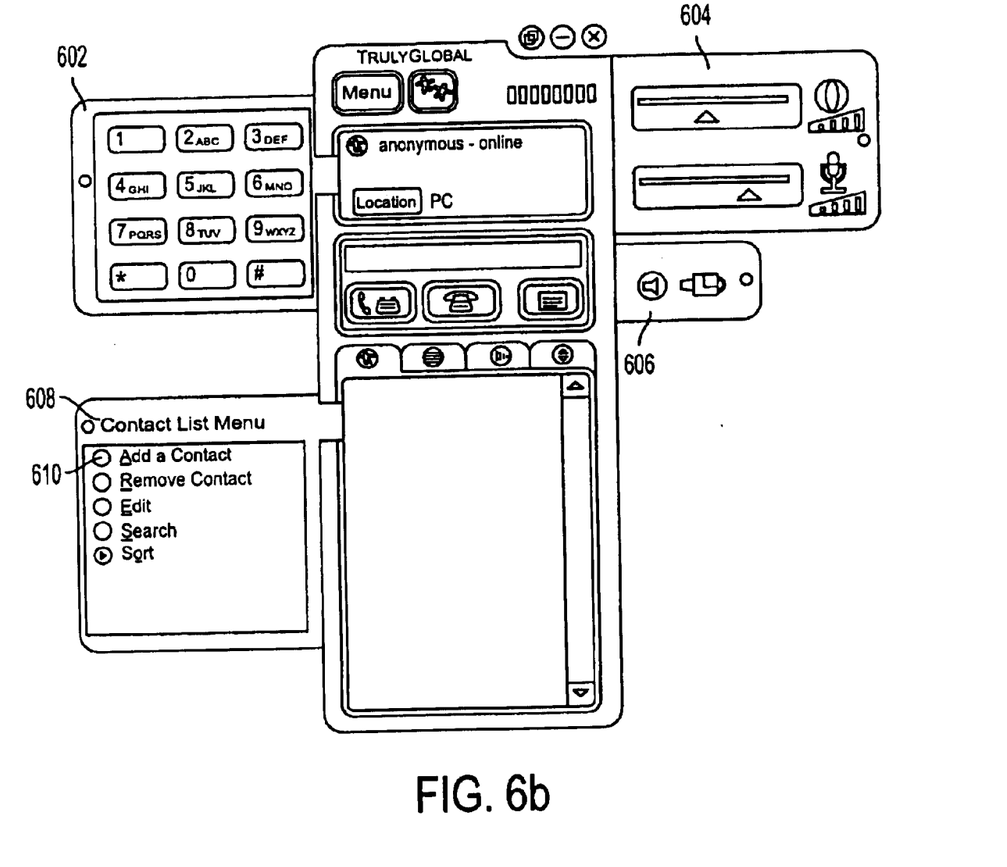

FIGS. 6a and 6b collectively illustrate a GUI implementing the present invention FIG. 6a illustrates a screenshot of the present invention interface for indicating availability modes associated with subscribers. In this example, the subscriber's name 'Anonymous' is currently logged onto server 422 (online)(FIG. 4) from location 'PC'. FIG. 6b illustrates an expanded screenshot of the interface in FIG. 6a. Panel 602 is used to connect to other subscribers who are currently logged on to server 422 (FIG. 4) and are capable of receiving network-based voice (e.g., VoIP). Panel 604 allows for audio related controls and panel 606 allows for displaying statistical information regarding audio and video parameters. Panel 608 allows various administration features, such as adding various other subscribers (whose policies are to be tracked and displayed) to the interface by clicking on the selection "Adding a contact" (610).

Figure 7:
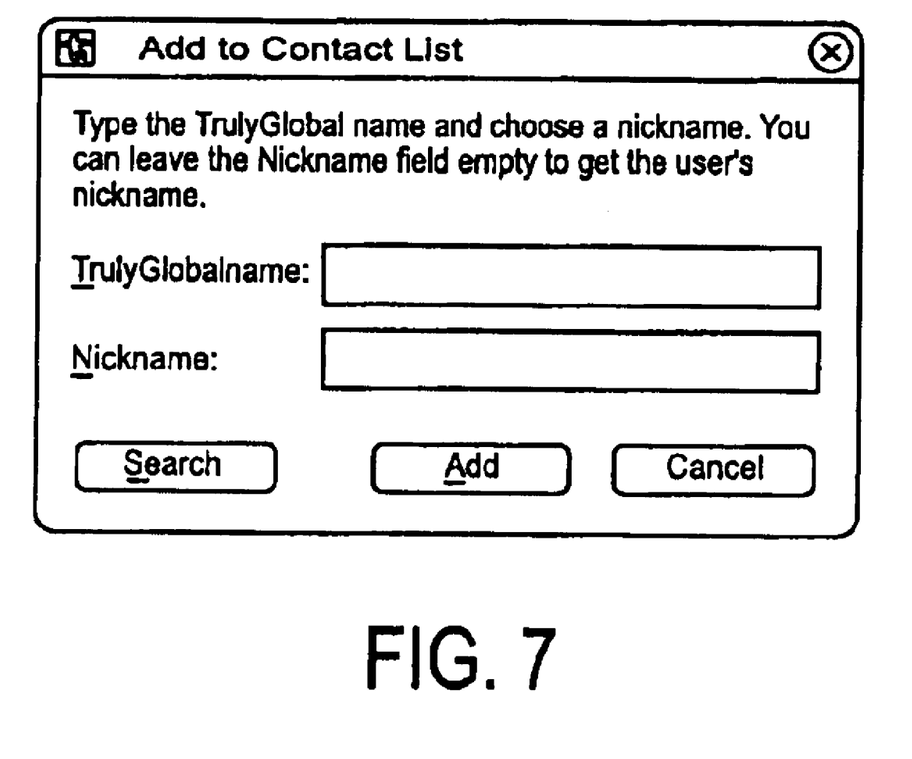
FIG. 7 illustrates a screenshot of the panel for adding a user in the contact list.
Figure 8:
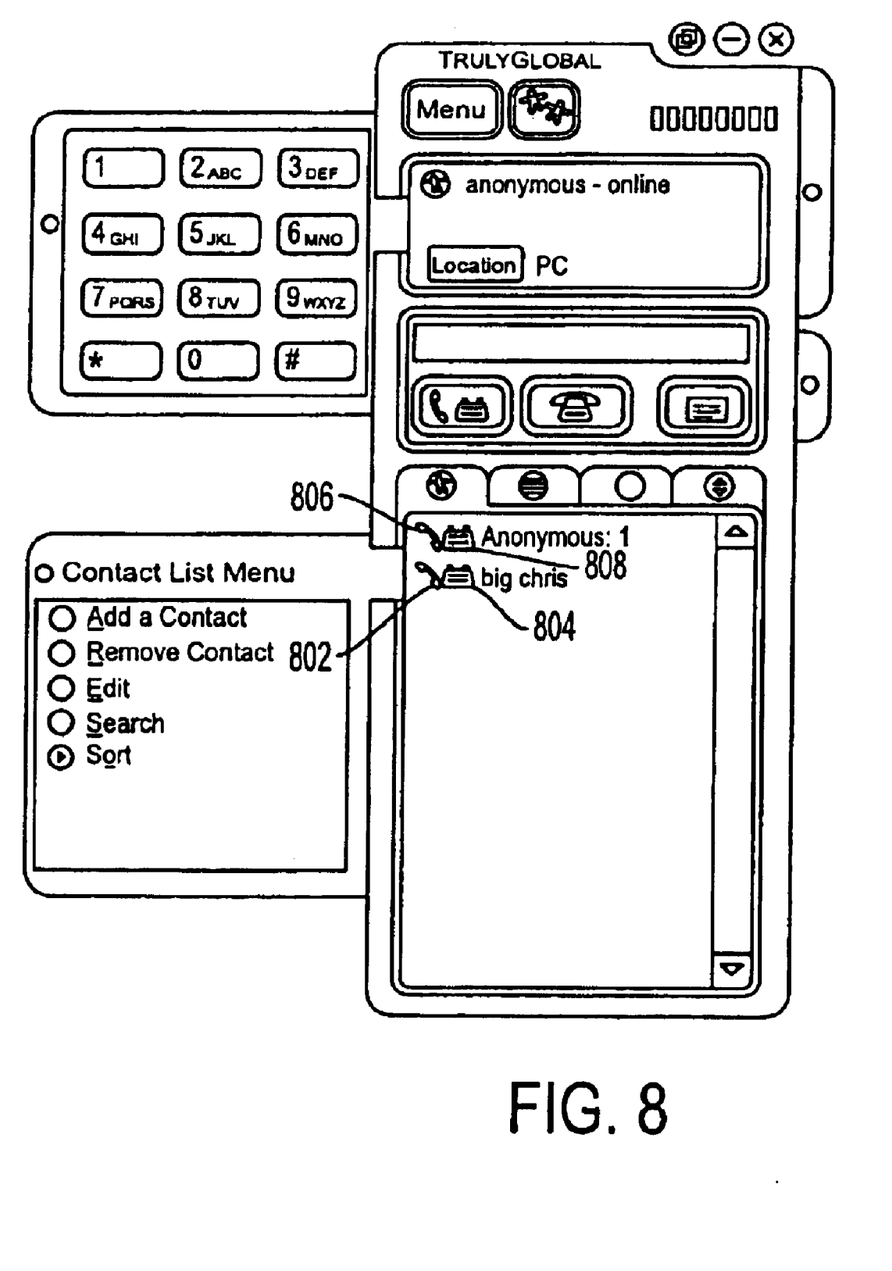
FIG. 8 illustrates the GUI of FIGS. 6a and 6b after two users have been added to the interface.

FIG. 7 illustrates panel 700 for adding a subscriber in the contact list. Field 702 in panel 700 allows subscribers to add another subscriber to their contact list by providing their login names associated with server 422. Optionally, subscribers in contact list can also be given nicknames (entered in field 704) for the ease of recognition FIG. 8 illustrates the interface after a couple of subscribers ('Anonymous 1' and 'big chris') have been added. It should be noted that icons 802 and 804 (associated with subscriber 'big chris') are visually different from icons 806 and 808 (associated with subscriber 'Anonymous 1') because subscriber 'big chris' is online and is allowing text and voice messages from subscriber 'anonymous'. The interface illustrated in FIG. 7 dynamically updates the availability of subscribers such as 'big chris', based on their routing policy and their desire to reveal their identity. Furthermore, the interface visually modifies icons (802 and 804) to indicate various availability modes associated with subscribers such as 'big chris'.

Thus, the present invention provides for a method and system for determining and informing subscribers and requestors regarding the availability mode of subscribers (connected to a server) based on subscriber routing policies plus preferences and presence of devices. The routing policy used in conjunction with the present invention is configurable by the subscriber to discriminate between various groups, thereby providing for the display of different policies for different people or groups of people.

CONCLUSION

A system and method has been shown in the above embodiments for the effective implementation of selectively revealing a subscriber's availability based on the identity of the requestor. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/ program, computing environment, specific computing hardware, number of subscribers, number of media types, number of routing policies or number or type of client devices.

The above enhancements and described functional elements are implemented in various computing environments. For example, the present invention may be implemented on a conventional IBM PC or equivalent, multi-nodal system (e.g., LAN) or networking system (e.g., Internet, WWW, wireless web). All programming, GUIs, display panels and screenshots, and data related thereto are stored in computer memory, static or dynamic, and may be retrieved by the subscriber in any of: conventional computer storage, display (i.e., CRT) and/or hardcopy (i.e., printed) formats. The programming of the present invention may be implemented by one of skill in the art of server based application and protocol-based network communications programming.

What is claimed is:

1. A method of revealing a communication status indicator to one or more entities, said indicator divulging the availability for communication of one or more subscribers for each of said entities, said status being modified based on one or more subscriber defined parameters, subscriber's active devices and an identity of an entity receiving the status indicator, said method comprising the steps of:

a. retrieving a subscriber's policy regarding communication with each identified entity;
b. retrieving presence information regarding the activation status of one or more communication devices utilized by said subscriber;
c. calculating, based on said subscriber's policy and retrieved presence information, said subscriber's availability, and
d. revealing said calculated subscriber's availability to said identified entities.

2. A method of revealing a communication status indicator to an entity, as per claim 1, wherein said subscriber's policy comprises a current routing policy and privacy preferences of said subscriber defining parameters of access with respect to said one or more entities.

3. A method of revealing a communication status indicator to an entity, as per claim 2, wherein each routing policy, from a plurality of stored routing policies, defines which of said one or more communication devices are in use in the current routing policy and a unique order of preference of use associated with said one or more communication devices in use by said subscriber.

4. A method of revealing a communication status indicator to an entity, as per claim 1, wherein said method is performed in one or more servers located on one or more networks.

5. A method of revealing a communication status indicator to an entity, as per claim 4, wherein said one or more networks comprise any of the following: local area network (LAN), wide area network (WAN), Internet, cellular or wireless network.

6. A method of revealing a communication status indicator to an entity, as per claim 3, wherein said plurality of stored routing policies are unique to said one or more entities or a specified group of entities.

7. A method of revealing a communication status indicator to an entity, as per claim 2, wherein said current routing policy further defines media types supported by said subscriber.

8. A method of revealing a communication status indicator to an entity, as per claim 2, wherein said current routing policy further comprises an ignore list for user defined entities or grouped entities.

9. A method of revealing a communication status indicator to an entity, as per claim 1, wherein said method further comprises revealing said calculated availability via an interface.

10. A method of revealing a communication status indicator to an entity, as per claim 9, wherein said interface is a graphical user interface (GUI), an aural interface or a combination of graphical and aural interfaces.

11. A method of revealing a communication status indicator to an entity, as per claim 10, wherein said aural interface comprises an IVR.

12. A method of revealing a communication status indicator to an entity, as per claim 10, wherein said method further comprises visually modifying an image in said GUI to indicate various availability modes associated with one or more subscribers.

13. A method of revealing a communication status indicator to an entity, as per claim 1, wherein said communication status indicator is available via an electronic message.

14. A method of revealing a communication status indicator to an entity, as per claim 2, wherein said current routing policy is controlled by an external service provider.

15. A network based system for dynamically revealing communication availability status of one or more subscribers to one or more entities, said network including one or more connected servers retaining and processing one or more elements of said system, said availability based on one or more subscriber defined parameters, subscriber's active devices and an identity of an entity receiving said availability status, said system comprising:

at least one server operatively connected to said one or more subscribers and entities;
one or more software agents, each operative with said server and comprising:
a policy retriever retrieving a policy of said one or more subscribers related to said one or more entities;
a presence retriever obtaining presence information regarding one or more communication devices utilized by said subscriber;
an availability calculator calculating, based on said policy and
obtained presence information, said subscriber's availability for one or more entities, and
said server transmitting said calculated subscriber's availability to at least one correlating entity of said one or more entities.

16. A network based system for dynamically revealing communication availability status of one or more subscribers to one or more entities, as per claim 15, wherein said subscriber's policy comprises a current routing policy and privacy preferences of said subscriber defining parameters of access with respect to said one or more entities.

17. A network based system for dynamically revealing communication availability status of one or more subscribers to one or more entities, as per claim 16, wherein each routing policy, of one or more stored routing policies, defines which of said one or more communication devices are in use for that policy and a unique order of preference associated with said one or more communication devices in use by said subscriber.

18. A network based system for dynamically revealing communication availability status of one or more subscribers to one or more entities, as per claim 15, wherein said one or more servers are located on any of: a local area network (LAN), a wide area network (WAN), the Internet and a cellular or wireless network.

19. A network based system for dynamically revealing communication availability status of one or more subscribers to one or more entities, as per claim 15, wherein said calculated availability is indicated via an interface, wherein said interface is any of the following: a graphical user interface (GUI), an aural interface, or a combination of aural and graphical interfaces.

20. A network based system for dynamically revealing communication availability status of one or more subscribers to one or more entities, as per claim 19, wherein said aural interface comprises an IVR.

21. A network based system for dynamically revealing communication availability status of one or more subscribers to one or more entities, as per claim 19, wherein said graphical user interface displays a visually modified image to indicate various availability modes associated with one or more subscribers.

22. A user interface indicating one or more modes of availability of communication associated with one or more subscribers in a contact list maintained by an entity, said interface comprising a panel:

indicating, via one or more status indicators, modes of availability for communicating with said one or more subscribers in said contact list, and said status indicators dynamically modified according to an altered availability of said one or more subscribers in said contact list, and wherein said availability is altered by a modification in any of, or a combination of: a subscriber's current routing policy, preferences or communication device's active status.

23. A user interface indicating one or more modes of availability of communication associated with one or more subscribers in a contact list maintained by an entity, as per claim 22, wherein said interface is any of the following: graphical user interface, aural interface, or a combination of aural and graphical interfaces.

24. A user interface indicating one or more modes of availability of communication associated with one or more subscribers in a contact list maintained by an entity, as per claim 22, wherein said status indicators are any of, or a combination of, the following: an image, an icon, an auditory icon, a network-based voice signal or an audio signal.

25. A user interface indicating one or more modes of availability of communication associated with one or more subscribers in a contact list maintained by an entity, as per claim 22, wherein said interface is browser based and said availability calculated remotely by an internet connected server.

26. An article of manufacture comprising computer usable medium having computer readable code embodied therein that dynamically reveals availability modes of communication of one or more subscribers to one or more entities, said medium comprising:
   a. computer readable program retrieving a subscriber's policy regarding communication with each identified entity;
   b. computer readable program retrieving presence information regarding the activation status of one or more communication devices utilized by said subscriber;
   c. computer readable program calculating, based on said subscriber's policy and retrieved presence information, said subscriber's availability, and
   d. computer readable program revealing said calculated subscriber's availability to said identified entities.

* * * * *

UNITED STATES PATENT AND TRADEMARK OFFICE
CERTIFICATE OF CORRECTION

PATENT NO. : 6,714,519 B2  Page 1 of 1
APPLICATION NO. : 09/916220
DATED : March 30, 2004
INVENTOR(S) : Omer Luzzatti et al.

It is certified that error appears in the above-identified patent and that said Letters Patent is hereby corrected as shown below:

On the Title Page of the patent, please delete item (63).

Col. 1, in the specification, on page one of the specification, lines 6 to 11, please delete the following sentence:

> "This is also a continuation-in-part of Ser. No. 09/714,016 filed Nov. 16, 2000, which was a continuation of Ser. No. 08/780,739 filed Jan. 8, 1997 now issued as U.S. Pat. No. 6,243,398 which was a continuation-in-part of Ser. No. 08/731,848 filed on Oct. 21, 1996 now abandoned."

Signed and Sealed this

Twenty-sixth Day of August, 2008

JON W. DUDAS
*Director of the United States Patent and Trademark Office*